US010433567B2

United States Patent
Catonnet et al.

(10) Patent No.: US 10,433,567 B2
(45) Date of Patent: Oct. 8, 2019

(54) METHOD TO LIGHTEN THE TEXTURE OF A FERMENTED DAIRY PRODUCT

(71) Applicant: COMPAGNIE GERVAIS DANONE, Paris (FR)

(72) Inventors: Guillaume Catonnet, Massy (FR); Jean-Marc Philippe, Leuville sur Orge (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 399 days.

(21) Appl. No.: 15/106,131

(22) PCT Filed: Dec. 19, 2014

(86) PCT No.: PCT/EP2014/078912
§ 371 (c)(1),
(2) Date: Jun. 17, 2016

(87) PCT Pub. No.: WO2015/092044
PCT Pub. Date: Jun. 25, 2015

(65) Prior Publication Data
US 2016/0309731 A1   Oct. 27, 2016

(30) Foreign Application Priority Data

Dec. 20, 2013   (WO) ............... PCT/IB2013/003009

(51) Int. Cl.
*A23C 9/12* (2006.01)
*A23C 9/137* (2006.01)
*A23C 19/076* (2006.01)
*A23L 29/212* (2016.01)
*A23L 29/256* (2016.01)
*A23L 29/281* (2016.01)
*A23C 9/123* (2006.01)

(52) U.S. Cl.
CPC ............. *A23C 9/137* (2013.01); *A23C 9/12* (2013.01); *A23C 9/123* (2013.01); *A23C 19/076* (2013.01); *A23L 29/212* (2016.08); *A23L 29/256* (2016.08); *A23L 29/284* (2016.08); *A23V 2002/00* (2013.01)

(58) Field of Classification Search
CPC ............ A23C 9/123; A23C 9/137; A23C 9/12
See application file for complete search history.

(56) References Cited

U.S. PATENT DOCUMENTS

| 3,729,322 A | 4/1973 | Calvert |
| 6,235,320 B1 * | 5/2001 | Daravingas ............ A23C 9/133 426/34 |
| 2009/0181130 A1 | 7/2009 | Noble et al. |
| 2010/0034937 A1 * | 2/2010 | Schmitt .................. A23G 9/34 426/306 |
| 2011/0287147 A1 | 11/2011 | Pannell et al. |

FOREIGN PATENT DOCUMENTS

| GB | 1141950 A | 2/1969 |
| WO | WO 2007/125208 A1 | 11/2007 |
| WO | WO 2014/058873 A2 | 4/2014 |

OTHER PUBLICATIONS

Camacho et al., "Stability of Whipped Dairy Creams Containing Locust Bean Gum/λ-carrageenan Mixtures During Freezing-thawing Processes," Food Research International, vol. 34, Jan. 1, 2001, pp. 887-894, X055133306.

International Search Report (form PCT/ISA/210), dated Mar. 17, 2015, for International Application No. PCT/EP2014/078912.

Sen et al., "Effect of Freezing and Thawing on the Sensory Qualities of Dairy Products," Indian Dairyman, vol. 39, No. 5, Jan. 1, 1987, pp. 231-234, XP009179527.

\* cited by examiner

Primary Examiner — Jenna A Watts
(74) Attorney, Agent, or Firm — Birch, Stewart, Kolasch & Birch, LLP

(57) ABSTRACT

The present invention relates to a method to lighten the texture of a fermented dairy product comprising the following successive steps of: (a) providing a fermented dairy product containing 0.001 to 8 wt % of a texturizing agent and having a solid content comprised between 9.5 and 42 wt % and a total protein content comprised between 2.5 and 25 wt %, (b) freezing the said fermented dairy product at a temperature below 0° C. to obtain a frozen fermented dairy product, and (c) thawing the said frozen fermented dairy product at a temperature comprised between 0° C. and 10° C. to obtain a refrigerated fermented dairy product with a lightened texture.

18 Claims, 4 Drawing Sheets

METHOD TO LIGHTEN THE TEXTURE OF A FERMENTED DAIRY PRODUCT

The present invention relates to a method to lighten the texture of a fermented dairy product, as well as to the fermented dairy product obtainable by such a method.

In view of the large amount of fermented dairy products consumed by consumers, there is always an interest in providing new fermented dairy products with various forms, tastes or textures.

Moreover, dairy products are known to be good for the health of consumers, especially children. Thanks to the calcium contained in such products, there is an interest to find new and attractive formulations of fermented dairy products, to incite them to eat more dairy products.

The present invention provides thus a fermented dairy product with a lightened texture.

Indeed, the inventors of the present invention have surprisingly discovered that it is possible to lighten the texture of a fermented dairy product by submitting it to a freezing/thawing cycle, whereas a lightened texture is generally obtained by incorporating air in the product.

The present invention relates thus to a method to lighten the texture of a fermented dairy product comprising the following steps of:

(i) providing a fermented dairy product containing 0.001 to 8 wt % of a texturizing agent and having a solid content comprised between 9.5 and 42 wt % and a total protein content comprised between 2.5 and 2.5 wt %, (ii) freezing the said fermented dairy product at a temperature below 0° C. to obtain a frozen fermented dairy product, and (iii) thawing the said frozen fermented dairy product at a temperature comprised between 0° C. and 10° C. to obtain a refrigerated fermented dairy product with a lightened texture ("final product").

By "refrigerated" fermented dairy product, is preferably meant in the present invention a fermented dairy product having a temperature of between 0 and 10° C., more preferably of between 1 and 8° C., and most preferably of between 2 and 6° C., which corresponds notably to its storage temperature.

The lightened texture of the final refrigerated fermented dairy product can notably be characterized by a penetrometry test.

Indeed, a penetrometry test performed in the same conditions on the refrigerated fermented dairy product obtained after or before the freezing and thawing steps (ii) and (iii) shows that the strength of penetration is higher for the refrigerated fermented dairy product obtained without freezing and thawing steps compared to the one for the refrigerated fermented dairy product obtained after freezing and thawing steps and thus that the refrigerated fermented dairy product obtained after the freezing and thawing steps has a lightened texture or a diminished hardness compared to the same refrigerated fermented dairy product obtained without freezing and thawing steps. Accordingly, as intended herein, the expression "Lightened texture" is considered equivalent to the expression "texture with a diminished hardness".

Preferably, the penetrometry test can be performed according to the invention by using a texture analyser such as the TA.XT plus from Stable Micro Systems. The penetrometry test used in the present invention involves that the mobile cylinder, having a diameter of 12.5 mm, of the texture analyzer is sunk into the fermented dairy product at a speed of 1 mm/sec. The value of the resulting strength of penetration is then read after preferably after a penetration distance in the fermented dairy product of between 7.5 mm 10 mm. The strength of penetration is expressed in grams (g) or in Newtons (N) and one of skill in the art can readily convert a strength of penetration expressed in one of the units to the other unit. In the present disclosure the strength of penetration is preferably expressed in grams (g).

The strength of the penetration into the refrigerated fermented dairy product before performing the freezing and thawing steps (ii) and (iii), as measured by the penetrometry test described previously, is advantageously comprised between 17 and 350 g, notably between 25 and 300 g, in particular between 50 and 250 g.

The strength of the penetration into the refrigerated fermented dairy product after performing the freezing and thawing steps (ii) and (iii), as measured by the penetrometry test described previously, is advantageously comprised between 15 and 250 g, notably between 20 and 200 g, in particular between 30 and 150 g.

According to a particular embodiment, the strength of the penetration into the refrigerated fermented dairy product after performing the freezing and thawing steps will be reduced of at least 10%, more preferably of at least 25% and most preferably of at least 50%, relatively to the strength of penetration into the refrigerated fermented dairy product before performing the freezing and thawing steps.

Fermented Dairy Product as Starting Material:

In the context of the present invention, "fermented dairy product" designates more particularly a fermented dairy product ready for human consumption, such as a fermented milk, a yoghurt, or a fresh cheese such as a white cheese or a petit-suisse. It can be also a strained fermented dairy product such as a strained yoghurt also called concentrated yoghurt or Greek-style yoghurt.

The terms "fermented milk" and "yoghurt" are given their usual meanings in the field of the dairy industry, that is, products destined for human consumption and originating from acidifying lactic fermentation of a milk substrate. These products can contain secondary ingredients such as fruits, vegetables, sugar, etc.

The expression "fermented milk" is thus reserved in the present application for a dairy product prepared with a milk substrate which has undergone treatment at least equivalent to pasteurisation, seeded with microorganisms belonging to the characteristic species or species of each product.

The term "yoghurt" is reserved for fermented milk obtained, according to local and constant usage, by the development of specific thermophilic lactic bacteria known as *Lactobacillus delbrueckii* subsp. *bulgaricus* and *Streptococcus thermophilus*, which must be in the living state in the finished product, at a minimum rate. In certain countries, regulations require the addition of other lactic bacteria to the production of yoghurt, and especially the additional use of strains of *Bifidobacterium* and/or *Lactobacillus acidophilus* and/or *Lactobacillus casei*. These additional lactic strains are intended to impart various properties to the finished product, such as that of favouring equilibrium of intestinal flora or modulating the immune system. The yoghurt can be a stirred or set yoghurt.

In practice, the expression "fermented milk" is therefore generally used to designate fermented milks other than yoghurts. It can also, according to country, be known by names as diverse as, for example, "Kefir", "Kumtss", "Lassi", "Dahi", "Leben", "Filmjolk", "Villi", "*Acidophilus* milk".

Finally, the name "white cheese" or "petit-Suisse" is, in the present application, reserved for unrefined non-salty cheese, which has undergone fermentation by lactic bacteria only (and no fermentation other than lactic fermentation).

The fermented dairy product is made from whole milk and/or wholly or partly skimmed milk, which can be used in a powder form which can be reconstituted by addition of water. Other milk components can be added such as cream, casein, caseinate (for ex. calcium or sodium caseinate), whey proteins notably in the form of a concentrate (WPC), milk proteins notably in the form of a concentrate (MPC), milk protein hydrolysates, and mixtures thereof.

The milk and milk components has typically an animal origin such as a cow, goat, sheep, buffalo, donkey or camel origin.

The fermented dairy product contains a texturizing agent which can be notably gelatine. In the present invention, the term "texturing agent" can be used as a synonym of the term "texturizing agent". In the context of the present invention, the term "texturizing agent" designates an agent used to modify the overall texture or mouthfeel of a food product, such as gelling agents (for ex. gelatine, agar, carrageenan, pectin, natural gums), stabilisers (for ex. starch, agar, pectin, gum, Arabic gelatin), thickeners (for ex. guar gum, xanthan gum, pectin, starch, agar, carrageenan, alginic acid). It can be more particularly a gelling agent such as gelatine, agar, carrageenan, or pectin, in particular gelatine, agar, or carrageenan.

The texturizing agent is incorporated in the fermented dairy product preferably in an amount which allows conferring to the fermented dairy product, as provided before the freezing and thawing steps (ii) and (iii) a hardness defined by a strength of penetration, preferably as measured by the penetrometry test described previously, comprised between 17 and 350 g, notably between 25 and 300 g, in particular between 50 and 250 g. The person skilled in the art can determine easily the necessary amount of texturizing agent.

According to a particular embodiment, the fermented dairy product contains 0.001 to 8 wt %, advantageously 0.03 to 3 wt %, of this texturizing agent relatively to the total weight of the fermented dairy product.

If the amount of the texturizing agent is too low, the final product will have a default of syneresis or/and thus a very wet texture.

If the amount of the texturizing agent is too high, the texture is too hard with some bad taste.

If the texturizing agent is gelatine, the fermented dairy will contain advantageously 0.3 to 3 wt %, notably 0.8 to 1.4 wt % or 1.6 to 3 wt % of gelatine relatively to the total weight of the fermented dairy product.

If the texturizing agent is agar, the fermented dairy will contain advantageously 1 to 3 wt %, notably 1.3 to 1.8 wt % or 1.8 to 3 wt % of agar relatively to the total weight of the fermented dairy product.

If the texturizing agent is carrageenan, the fermented dairy will contain advantageously 0.5 to 3 wt %, notably 1.2 to 1.8 wt % or 1.9 to 3 wt % of carrageenan relatively to the total weight of the fermented dairy product.

Other food additives can be present, in addition to the texturizing agent, notably chosen among:
sugars and sweeteners:
  sugars and sweeteners are food-acceptable carbohydrate sweetening agents that may be natural or artificial, no or low calorie sweeteners;
  preferred examples of appropriate sugars are sucrose, fructose, lactose, glucose and maltose. Such sugars can be incorporated in the form of beet sugar, cane sugar, maple sugar, molasses, corn syrup, malt syrup, maple syrup, agave nectar or also honey;
  preferred examples of appropriate no or low calorie sweeteners are aspartame, sucralose, acesulfame potassium, saccharin, sodium cyclamate, thaumatin, tagatose, neohesperidin dihydrochalcone, isomaltulose, rebaudioside A or also a *stevia* extract (containing rebaudioside A),
vitamins (e.g. vitamin A, B1, B2, B6, B12, C, D, E or K, folic acid, etc.),
anti-oxidants,
pH-modifying agents (e.g. buffering agents or acidifying agents such as citric acid and its salts, for ex. sodium, potassium or calcium citrate),
lubricants (e.g. vegetable oils),
preservatives (e.g. sorbic acid and its salts such as sodium, potassium and calcium salts, sulphur dioxide, benzoic acid and its salts such as sodium, potassium and calcium salts, ethyl, methyl or propyl p-hydroxybenzoate, etc.),
taste exhausters (e.g. glutamic acid and its salts such as sodium, potassium, calcium, magnesium or ammonium salts),
flavouring aromatic agents of synthetic or natural origin (e.g. fruit flavours), and
colouring agents (pigments, dyes, etc.).

If need be, the skilled artisan will be able to choose appropriate food additives among all the well-known food additives and excipients available on the market.

These food additives, including the texturizing agent, can be added before or after the fermentation step allowing the preparation of the fermented dairy product from a non-fermented dairy product, sometimes named the white mass, containing thus milk and milk components and optionally other food additives.

The non-fermented dairy product is generally first pasteurised before being fermented.

The pasteurisation step is a heating treatment at a temperature comprised between 72° C. and 138° C., preferably during 2 seconds to 30 minutes. Such a step and its conditions are well known to the one skilled in the art.

The fermentation step is a lactic fermentation using techniques which are known to the skilled person.

When reference is made to a "Lactic fermentation", this means an acidifying lactic fermentation which results in milk coagulation and acidification following the production of lactic acid which may be accompanied by the production of other acids, carbon dioxide and various substances such as exopolysaccharides (EPS) or aromatic substances, for example diacetyl and acetaldehyde.

To perform such a lactic fermentation, lactic ferments are added to the non-fermented dairy product, which has generally been pasteurized beforehand, and the temperature is kept between 25° C. and 44° C., preferably for 3 to 16 hours.

In the framework of the present invention, various ferments can be used for performing the fermentation of the dairy product and in particular a culture of lactic acid bacteria such as:
*Lactobacillus* sp. (for ex. *Lactobacillus bulgaricus, Lactobacillus acidophilus, Lactobacillus paracasei, Lactobacillus pentosus, Lactobacillus helveticus, Lactobacillus reuteri, Lactobacillus plantarum, Lactobacillus bifidus* and combinations thereof),
*Lactococcus* sp. (for ex. *Lactococcus lactis*),
*Bifidobacterium* sp. (for ex. *Bifidobacterium bifidum, Bifidobacterium Infantis, Bifidobacterium animalis*, especially *Bifidobacterium animalis* subsp. *lactis, Bifidobacterium breve, Bifidobacterium longum* and combinations thereof), and

*Streptococcus* sp. (for ex. *Streptococcus thermophilus, Streptococcus lactis, Streptococcus raffinolactis, Streptococcus cremoris* and combinations thereof).

Preferred lactic acid bacteria to be used in the present invention are selected from *Lactobacillus bulgaricus, Streptococcus thermophilus, Lactococcus lactis, Bifidobacterium animalis* subsp. *lactis*, and combinations thereof.

When the fermented dairy product is cheese, rennet will be also present to coagulate the milk.

The "total protein content" of a product corresponds to the weight of the proteins present in the product relatively to the total weight of the product. The total protein content is expressed as a weight percentage.

The total protein content can be measured by Kjeldahl analysis (NF EN ISO 8968-1) as the reference method for the determination of the protein content of dairy products based on measurement of total nitrogen. Nitrogen is multiplied by a factor, typically 6.38, to express the results as total protein. The method is described in both AOAC Method 991.20 (1) and international Dairy Federation Standard (IDF) 20B:1993.

If the total protein content is known for all the ingredients used to prepare the fermented dairy product, the total protein content of the fermented dairy product can be calculated from these data.

The fermented dairy product used as a starting material in the process of the present invention has a total protein content of between 2.5 and 25 wt %, notably between 3.5 and 20 wt %, preferably between 6 and 17 wt %, more preferably between 9 and 13 wt %.

If the total protein content is below 2.5 wt %, the texture after thawing is not enough thick and does not give a tight framework.

If the total protein content is above 25 wt %, the texture becomes less spongy and appears as a sticky gel.

The "solid content" of a product corresponds to the dry matter, i.e. the weight of non-volatile components present in the product relatively to the total weight of the product. The solid content is expressed as a weight percentage. The "non-volatile components" correspond to the solids that remain after an evaporation step of the product at 103-105° C. The solid content can be measured by the method disclosed in NF V04 370 comprising a heating step at 102° C.

If the solid content is known for all the ingredients used to prepare the fermented dairy product, the solid content of the fermented dairy product can be calculated from these data.

The fermented dairy product used as a starting material in the process of the present invention has a solid content of between 9.5 and 42 wt %, notably between 15 and 40 wt %, preferably between 25 and 35 wt %.

If the solid content is below 9.5 wt %, the texture after thawing is not enough thick and does not give a tight framework.

If the solid content is above 42 wt %, the texture becomes less spongy and appears as a sticky gel.

The "fat content" of a product corresponds to the weight of the fat components present in the product relatively to the total weight of the product. The fat content is expressed as a weight percentage.

The fat content can be measured by the Weibull-Berntrop gravimetric method described in the standard NF ISO 8262-3.

If the fat content is known for all the ingredients used to prepare the fermented dairy product, the fat content of the fermented dairy product can be calculated from these data.

The fat content can be any fat content commonly used in fermented dairy products since it is not an essential parameter for the method according to the present invention. The fermented dairy product used as a starting material in the process of the present invention can have thus a fat content of between 0 and 10 wt %, notably between 2 and 6 wt %, in particular between 3 and 5 wt %.

Preferably, the pH of the fermented dairy product used as a starting material in the process of the present invention is comprised between 4.2 and 5.5, notably between 4.6 and 5.2.

Container:

According to a preferred embodiment, the fermented dairy product used as a starting material in the process of the present invention is already placed in the container used for the final product before performing the freezing step (b).

The container can be any container commonly used for fermented dairy product with any shape. The container can be made notably of plastic, metal (e.g. aluminium), glass, ceramic, cardboard, or combinations thereof.

The container can be in particular a container for a single serving. It will be more particularly adapted for a portion of fermented dairy product of 50 to 250 g.

Preferably, the thickness of the fermented dairy product in the container will be comprised between 10 and 100 mm.

By "thickness" is meant in the present invention the height of the fermented dairy product in the container.

The dairy product can be filled into the container before or after the fermentation step. Thus, in a first embodiment, the non-fermented dairy product, pasteurized or not, can be filled into the container before performing the fermentation step, and optionally before also the pasteurisation step. In a second embodiment, the non-fermented dairy product is first pasteurized and fermented before being filled in the container.

The container can then be sealed before or after the freezing step (b).

Freezing Step:

By "frozen fermented dairy product" is meant a fermented dairy product having a temperature equal or below a target negative temperature in all the parts of the fermented dairy product, and in particular in the heart/centre of the product. Such a temperature can be measured by a temperature sensor in the centre of the product since the centre will be the last part of the product to be frozen.

By "negative temperature" is meant a temperature below 0° C.

Preferably, the target negative temperature will be below 0° C., advantageously equal or below −10° C., notably equal or below −20° C. Preferably, the target negative temperature will not be below −50° C., notably −80° C. for economic reasons. The target negative temperature will be notably between less than 0° C. and −50° C., advantageously between −5° C. and −40° C., notably between −10° C. and −30° C., such as between −20° C. and −30° C.

Thus the temperature in all the parts of the frozen fermented dairy product will be notably between less than 0° C. and −50° C., advantageously between −5° C. and −40° C., notably between −10° C. and −30° C.

The freezing step will thus be carried out during a sufficient time to obtain a frozen fermented dairy product as defined above. The time necessary to freeze the fermented dairy product until the centre of the product depends on various parameter such as the volume and the thickness of the product to be frozen, its composition, etc. The person skilled in the art can however determine easily when the fermented dairy product is fully frozen at the target temperature by use of a temperature sensor as indicated above.

The thickness of the fermented dairy product in the container will be comprised advantageously between 10 and 100 mm. With such a thickness, the duration of the freezing step is notably between 10 and 120 min, in particular between 20 and 90 min. This allows cooling the temperature of the fermented dairy product from room temperature (i.e. between about 20 and 25° C.) to a target temperature notably between less than 0° C. and −20° C., notably of about −20° C. A thicker fermented dairy product can be used. However, it will lead to a longer freezing step which is not desirable, notably for economic reasons.

Thus, the fermented dairy product will be frozen advantageously at an average rate of 20 to 120° C./h, notably of 30 to 100° C./h, in particular for a fermented dairy product having a thickness comprised between 10 and 100 mm.

By "average rate" is meant the average rate of freezing calculated by means of the formula $(T_S - T_F)/t$ where $T_S$ is the temperature of the fermented dairy product before the freezing step, $T_F$ is the temperature of the frozen fermented dairy product at the end of the freezing step, in particular in the heart/centre of the product, and t is the time necessary to cool the fermented dairy product from the temperature $T_S$ to the temperature $T_F$.

In a particular embodiment of the freezing step (b), the fermented dairy product is:

(i) first brought to a temperature of −2 to 2° C., in particular of about 0° C., in less than 8 to 12 minutes, in particular in less than about 10 minutes, (ii) then brought to a temperature of −5 to −10° C. in 15 to 30 minutes, and (iii) finally brought to a temperature of at least −20° C. in less than 8 to 12 minutes, in particular in less than about 10 minutes.

Any means can be used to freeze the fermented dairy product. Thus the freezing step can be carried out by direct contact of the fermented dairy product with a refrigerant such as liquid nitrogen, liquid $CO_2$ or cold air (e.g. in a cryogenic freezer, a cryogenic tunnel, a deep-freezer, a deep-freezing tunnel, etc.) or by indirect contact (e.g. in a freezer).

Thawing Step:

By "refrigerated fermented dairy product" is meant a fermented dairy product having a storage temperature of between 0 and 10° C., notably between 1 and 8° C., preferably between 2 and 6° C.

The thawing step can be carried out by placing the frozen fermented dairy product in a refrigerated room or device in which the temperature is of between 0 and 10° C., notably between 1 and 8° C., preferably between 2 and 6° C., i.e. the storage temperature of the refrigerated fermented dairy product (e.g. cold room or refrigerator).

At the end of the thawing step, the fermented dairy product has a temperature of between 0 and 10° C., notably between 1 and 8° C., preferably between 2 and 6° C. (i.e. in all the parts of the fermented dairy product). Such a temperature can be measured by a temperature sensor in the centre of the product since the centre will be the last part of the product to be thawed.

The thawing step will thus be carried out during a sufficient time to obtain a refrigerated fermented dairy product as defined above. The time necessary to refrigerate the frozen fermented dairy product until the centre of the product depends on various parameter such as the temperature of the frozen fermented dairy product, its volume, its nature/composition, etc. The person skilled in the art can however determine easily when the fermented dairy product is fully thawed and refrigerated by use of a temperature sensor as indicated above.

The duration of the thawing step will be notably of at least 10 h, notably at least 15 h.

Refrigerated Fermented Dairy Product with a Lightened Texture ("Final Product"):

The fermented dairy product obtained by the method of the present invention is a refrigerated fermented dairy product, i.e. a fermented dairy product having a storage temperature of between 0 and 10° C., more advantageously of between 1 and 8° C., preferably between 2 and 6° C.

The fermented dairy product obtained after the freezing and thawing steps has a lightened texture compared to the same product which has been simply refrigerated by placing it during a sufficient time in a refrigerated room or device in which the temperature is of between 0 and 10° C., notably between 1 and 8° C., preferably between 2 and 6° C.

Such a difference of texture (with or without freezing and thawing steps) can be evidenced by a penetrometry test, as indicated previously.

The lightened texture of the final product, as sensed in the mouth, is spongy and wet but without syneresis, notably such as a "cheesecake". The texture is thus heterogeneous and rough. The texture can be compared to a mousse in which liquid is present in place of gas (air). Depending on the freezing step or on the solid content of the starting fermented dairy product, the network of the texture will have a thin or large mesh. The shorter the freezing step is or the higher the solid content is, the thinner the mesh is.

Without the freezing and thawing steps, the fermented dairy product has on the contrary a homogeneous gelatinous texture, such as a "panacotta".

Thus, the lightened texture of the refrigerated fermented dairy product obtained by the method according to the present invention is a texture as sensed in mouth comprising, or consisting of, at least one of decreased firmness, increased melting, increased wetness, increased sponginess, decreased stickiness and increased grain, as compared to refrigerated fermented dairy product before performing the freezing and thawing steps (ii) and (iii), preferably while maintaining the cohesiveness of the refrigerated fermented dairy product obtained by the method according to the present invention compared to refrigerated fermented dairy product before performing the freezing and thawing steps (ii) and (iii).

Topping and Base Layer:

A topping and/or a base layer can be placed above (for the topping) or below (for the base layer) the fermented dairy product (in the container) before or after the freezing step. Preferably, a topping will be added after the freezing step.

The topping and/or base layer can comprise a sauce (for ex. a fruit sauce, a chocolate sauce, a vanilla sauce or a caramel sauce), a jelly (such as a fruit jelly), a jam, fruits or fruit pieces, another layer of a fermented dairy product (for ex. yoghurt, fresh cheese or also whipped cream), chocolate pieces (for ex. chocolate chips or curls), cereal-based toppings (for ex. corn flakes, puffed rice optionally coated with chocolate, etc.) and combinations thereof.

The sauce or jelly can comprise various ingredients such as:

fruit juice or puree which can be in a natural form, a concentrate form, a jelly form or a powder form (for the fruit sauce or jelly), chocolate or chocolate flavour (for the chocolate sauce), vanilla or vanilla flavour (for the vanilla sauce), caramel or caramel flavour (for the caramel sauce), water, sugars and sweeteners:
sugars and sweeteners are food-acceptable carbohydrate sweetening agents that may be natural or artificial, no or low calorie sweeteners;
preferred examples of appropriate sugars are sucrose, fructose, lactose, glucose and maltose. Such sugars can be incorporated in the form of beet sugar, cane sugar, maple sugar, molasses, corn syrup, malt syrup, maple syrup, agave nectar or also honey;
preferred examples of appropriate no or low calorie sweeteners are aspartame, sucralose, acesulfame potassium, saccharin, sodium cyclamate, thaumatin, tagatose, neohesperidin dihydrochalcone, isomaltulose, rebaudioside A or also a *stevia* extract (containing rebaudioside A),
fat,
vitamins (e.g. vitamin A, B1, B2, B6, B12, C, D, E or K, folic acid, etc.),
anti-oxidants,
pH-modifying agents (e.g. buffering agents or acidifying agents such as citric acid and its salts, for ex. sodium, potassium or calcium citrate),
lubricants (e.g. vegetable oils),
stabilisers,
thickening or gelling agents (in particular in the case of a jellified sauce) (e.g. gelatine, alginate, carrageenans, pectin, starches, xanthan, guar gum, gum arabic, gellan gum, locust bean gum and combinations thereof),
emulsifiers (e.g. Lecithins, soy proteins),
preservatives (e.g. sorbic acid and its salts such as sodium, potassium and calcium salts, sulphur dioxide, benzoic acid and its salts such as sodium, potassium and calcium salts, ethyl, methyl or propyl p-hydroxybenzoate, etc.),
taste exhausters (e.g. glutamic acid and its salts such as sodium, potassium, calcium, magnesium or ammonium salts),
flavouring aromatic agents of synthetic or natural origin (e.g. fruit, chocolate, vanilla or caramel flavours), and
colouring agents (pigments, dyes, etc.).

Fruits (used as such or in the fruit pieces, fruit sauce, fruit jelly or jam) can be chosen for example among orange, mandarin, grapefruit, lemon, rhubarb, plum, grape, mango, passion fruit, pineapple, coconut, peach, apricot, pear, apple, melon, watermelon, kiwi, carrot, red fruit as raspberry, cranberries, strawberry, blueberry, blackberry, cherry, redcurrants, whortleberry, and combinations thereof.

According to a preferred embodiment, the method according to the invention comprises the following successive steps of:
(i) providing a fermented dairy product containing 0.001 to 8 wt % of a texturizing agent, in particular a gelling agent such as gelatine, agar, or carrageenan, and having a solid content comprised between 9.5 and 42 wt % and a total protein content comprised between 2.5 and 25 wt %,
(ii) pouring the said fermented dairy product in containers adapted notably for a portion of the fermented dairy product of 50 to 250 g and having a thickness comprised between 10 and 100 mm,
(iii) freezing the said fermented dairy product at a temperature below 0° C. to obtain a frozen fermented dairy product having preferably a temperature equal or below −10° C., notably equal or below −20° C.,
(iv) optionally coating the frozen fermented dairy product with a topping such as a sauce or jelly (notably a fruit sauce or jelly), and
(v) thawing the said frozen fermented dairy product, optionally coated with a topping, at a temperature comprised between 2° C. and 8° C. to obtain a refrigerated fermented dairy product with a lightened texture.

The present invention relates also to the refrigerated fermented dairy product obtainable by the method described above.

The invention will be better understood in view of the following examples and figures, these examples serving solely to illustrate the invention.

FIGURES

The Line with diamond corresponds to the compositions 5 to 10 not submitted to a freezing step.

The line with square corresponds to the compositions 5 to 10 submitted to a freezing step, followed by a thawing step.

Figure 4:
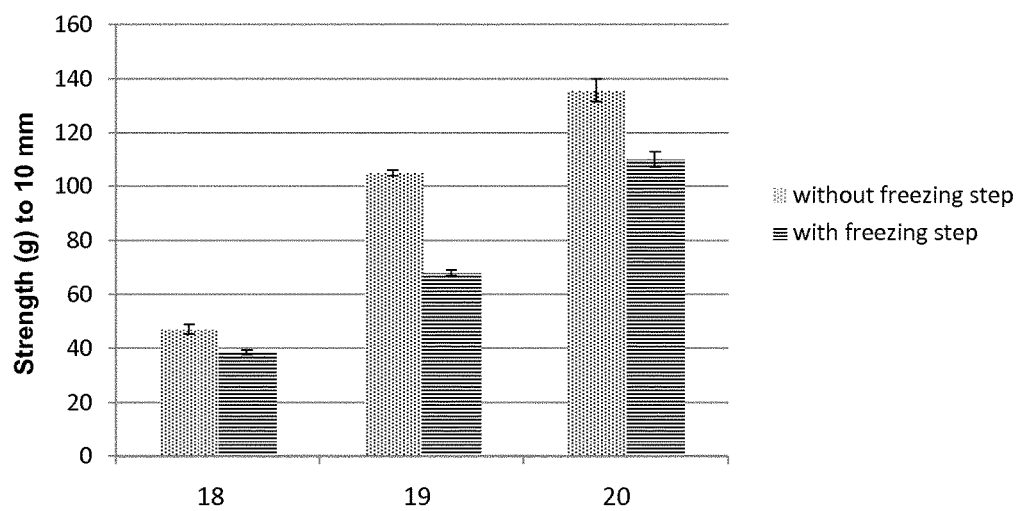

FIG. 4 represents the strength of penetration (g) of the compositions 18, 19 and 20 (described in example 5; from left to right) submitted or not to a freezing step, followed when appropriate by a thawing step. The strength of penetration (g) was measured at 10 mm of distance.

The diagram with points (on the left) corresponds to the compositions not submitted to a freezing step.

The diagram with bars (on the right) corresponds to the compositions submitted to a freezing step, followed by a thawing step.

Figure 5:
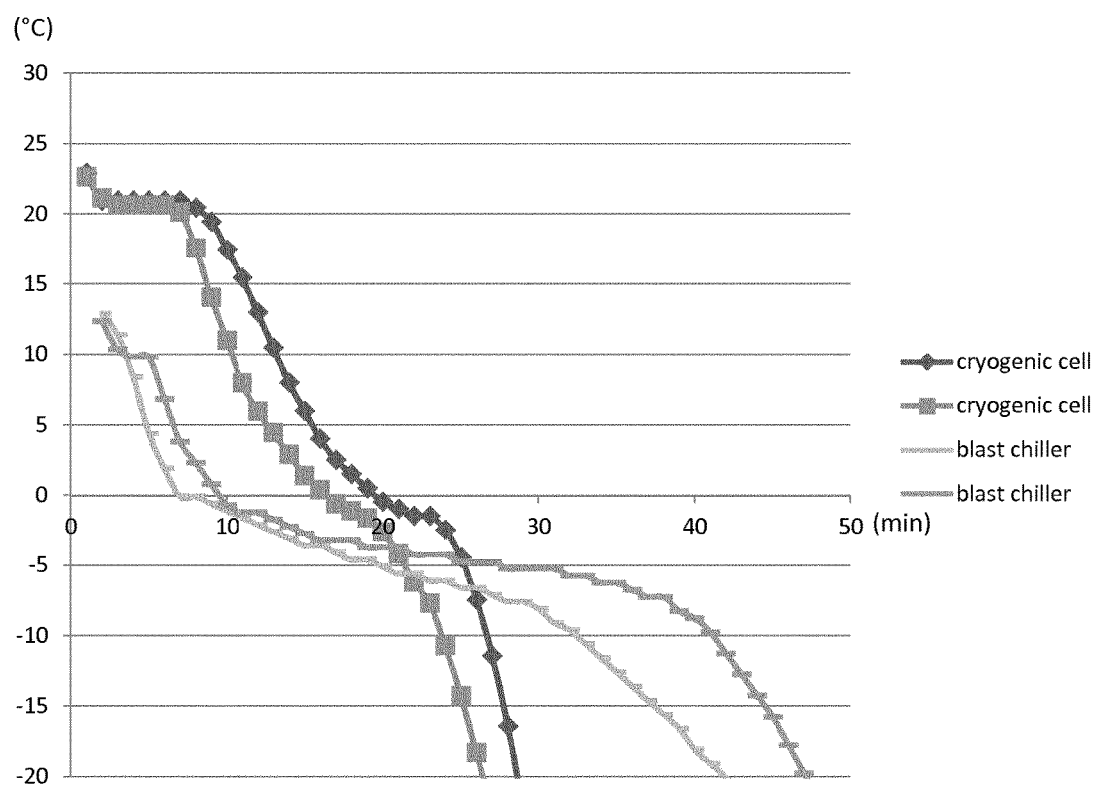

FIG. 5 represents the kinetic of freezing of a composition 1 to reach −20° C. in heart of the product. The line without symbol corresponds to freezing with a blast shiller −40° C. The line with symbols (diamond or square) corresponds to freezing with a cryogenic cell −100° C.

EXAMPLES

In the following examples, Activia® cheese, Oikos® and plain set yoghurt are used notably as starting material. These products are prepared as follows:
Activia® cheese:
Skimmed milk is pasteurised and fermented with lactic acid bacteria and smoothed by a filter to prepare a stirred white mass.
Skimmed milk is pasteurized and fermented by a lactic culture in the presence of animal rennet. The white mass obtained in then concentrated by centrifugation to obtain a free fat paste (8.4% proteins, 0.1% fat).
50 wt % of the stirred white mass and 50 wt % of the free fat paste are mixed to obtain Activia® cheese.
Oikos® 0.1% fat:
Skimmed milk is pasteurised and fermented with lactic acid bacteria to prepare a stirred white mass. This white mass is then concentrated by centrifugation in order to obtain a protein content of 10%.

Oikos® 2.9% FAT:

Oikos® 2.9% fat is prepared by mixing Oikos® 0.1% fat with 11 wt % of sterilized cream 26%.

Plain set yoghurt:

Skimmed milk, skimmed milk powder and cream 40% are mixed, pasteurized and fermented with lactic acid bacteria to prepare the plain set yoghurt (protein 3.7% and fat 1%).

Example 1

A first fermented dairy product (Greek-style yoghurt) having the following composition has been tested:

TABLE 1

| Ingredients and parameters | Composition 1 (wt %) |
|---|---|
| Oikos ® 0.1% fat (Danone) | 75 |
| Cream 35% | 9.5 |
| Cristal sugar | 8 |
| Whole milk | 6.2 |
| Gelatine 250 PS100 (Rousselot) | 1.3 |
| Solid content (%)* | 25.8 |
| Total protein content (%)* | 9.1 |
| Fat content (%)* | 3.8 |
| Carbohydrate content (%)* | 10.7 |

*calculated from the values of the ingredients

This fermented dairy product has been prepared by mixing 75% Oikos® 0.1% fat with 25% of a second mix. The second mix is prepared by mixing whole milk, cream, sugar and gelatine at a temperature between 70 to 75'. When the temperature is between 40 and 50° C., this second mix is added into the oikos mix.

A) 60 g of this fermented dairy product have been filled in a container (having a thickness comprised between 30 and 65 mm) before being frozen in a blast chiller "Alexander 5" from Studio 54 srl company at a temperature set point of −40° C. into the cell during 40 to 60 min to obtain a frozen fermented dairy product with a temperature of about −20° C. in the heart of the product.

The frozen fermented dairy product has then been thawed by placing it in a cold chamber at 4° C. during 30 hours.

B) A comparative example has been carried out by placing the container ((having a thickness comprised between 30 and 65 mm) filled with 60 g of the fermented dairy product directly in a cold chamber at 4° C. during 30 hours.

Figure 1A:
FIGS. 1A and 1B are photographs of the composition 1 described in example 1 below (A) after freezing and thawing steps (FIG. 1A) or (B) without implementation of freezing and thawing steps (FIG. 1B).
Figure 1B:
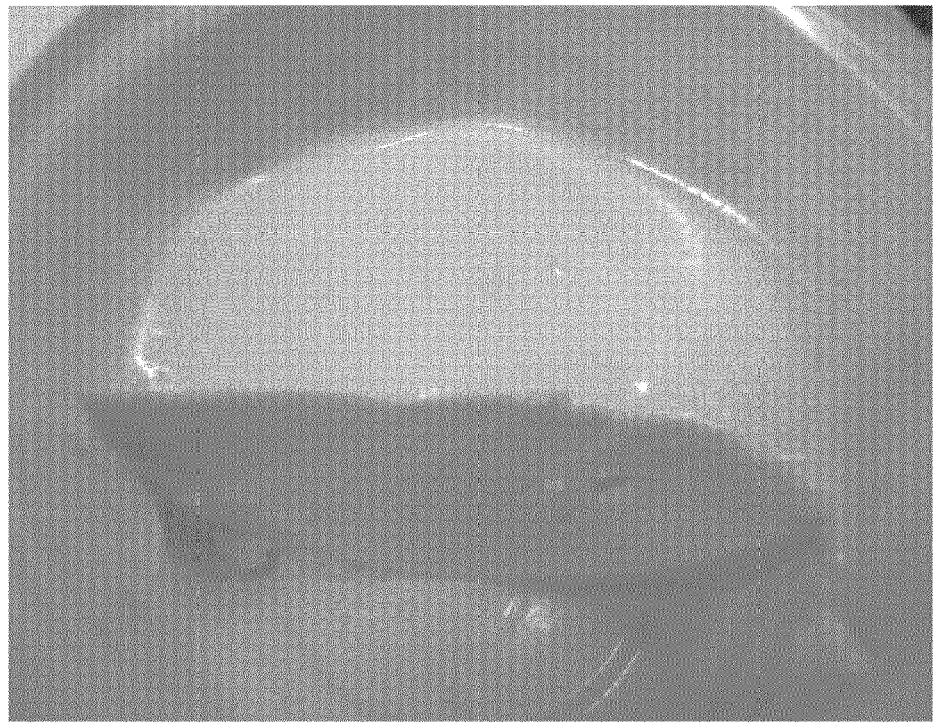
Figure 2:
FIG. 2 is a photograph of the composition 1 described in example 1 below (A) after freezing and thawing steps (compound A, on the right side) or (B) without implementation of freezing and thawing steps (compound B, on the left side).

Photographs of the product after a freezing step (product according to the invention, A)) or without a freezing step (comparative product, B)) are presented respectively on FIGS. 1A and 1B. These photographs show the change of texture observed after a freezing step.

Sensory Test:

The fermented dairy product subjected to a freezing step and the comparative fermented dairy product not subjected to a freezing step have been tasted by a panel of 15 tasters. It was asked to these tasters to determine, for each composition, if the surface of the product was heterogeneous, shiny; if there is a strong print with the spoon; if the texture was heterogeneous, firm, spongy/wet, sticky, grainy/rough, lighten, cohesive; and if the product disappears rapidly in the mouth.

The results obtained are presented in the table below.

TABLE 2

| Sensory test | | Composition 1 with a freezing step, A) | Composition 1 without a freezing step, B) |
|---|---|---|---|
| Surface (visually) | Heterogeneous | 15 | 0 |
| | Shiny | 0 | 15 |
| Texture (visually) | Print with a spoon | 6 | 14 |
| | Heterogeneous | 14 | 0 |
| Texture (in mouth) | Firm | 3 | 15 |
| | Product disappears rapidly in the mouth | 11 | 3 |
| | Spongy/wet | 15 | 0 |
| | Sticky | 2 | 10 |
| | Grainy/rough | 14 | 0 |
| | Lighten | 15 | 0 |
| | Cohesive | 12 | 5 |

Penetrometry Test:

The hardness of the texture was measured by a penetrometry test using the TA.XT plus from Stable Micro Systems as a texture analyser. The method uses a cylinder (12.5 mm diameter), a speed of 1 mm/sec, and a distance of 15 mm. The value of strength is read between 7.5 mm and 10 mm of distance. The greater the strength of penetration is, the less lighten the final product is and vice versa.

The results obtained are:

TABLE 3

| | Strength (g) | Standard Deviation |
|---|---|---|
| Composition 1 with freezing/thawing | 144 | 8 |
| Composition 1 without freezing | 163 | 9 |

These tests evidenced the change of texture of the fermented dairy product observed after a freezing step followed by a thawing step, the texture being lightened.

Example 2: Use of Various Types of Fermented Dairy Products

Example 1 was reproduced with various types of fermented dairy products. The following compositions have thus been tested:

TABLE 4

| | Compositions (wt %) | | |
|---|---|---|---|
| Ingredients and parameters | 2 | 3 | 4 |
| Activia ® cheese (Danone) | 68.6 | — | — |
| Tricalcium citrate | 4 | — | — |
| Cristal sugar | 8 | 9 | — |
| Ultra-sperse ® HV starch (National Starch) | 0.4 | — | 0.4 |
| WPC* 515 (Fonterra) | 6 | — | — |
| Cream 35% | 6 | — | — |
| Gelatine 250 PS100 (Rousselot) | 1 | 1.3 | 1 |
| Whole milk | 6 | — | 6 |
| Cream 40% | — | 8 | — |
| Skimmed milk | — | 71.7 | — |
| Skimmed milk powder | — | 10 | — |
| Plain set yoghurt (Danone) | — | — | 92.6 |
| Solid content (%) ** | 32.4 | 32.0 | 14.1 |
| Total protein content (%) ** | 10.7 | 6.0 | 4.6 |
| Fat content (%) *** | 4.8 | 3.6 | 1.1 |
| Carbohydrate content (%) ** | 12.9 | 17.8 | 7.1 |

*WPC = Whey protein concentrate
** calculated from the values of the ingredients The compositions have been prepared as follow:

Composition 2: This composition (white cheese) was prepared by mixing Activia® cheese with starch, sugar and tricalcium citrate in order to obtain a first intermediate mix. A second intermediate mix was prepared by mixing whole milk and cream at a temperature between 55 to 60° C. and then adding powder of gelatine and WPC at a temperature between 70° C. and 75° C. during after 5 minutes of maximal stirring with a disperser Heidolph equipped with a blade deflocculator This second intermediate mix was then added to the first intermediate mix.

Composition 3: This composition of the first intermediate mix was prepared by mixing 66% of skimmed milk, cream, skimmed milk powder, and sugar. The mix was then pasteurized and fermented with lactic acid bacteria. The fermentation lasted between 8 to 10 hours at a temperature of 40° C. When the curd reached a pH of 4.7, the fermentation was stopped. A second intermediate mix was prepared by mixing the other 6% of skimmed milk and gelatine at the temperature between 70° C. and 75° C. during 5 minutes of maximal stirring with a disperser Heidolph equipped with a blade deflocculator When the temperature is between 40 and 50° C., this second mix is added into the first mix.

Composition 4: Starch was added into 93% plain set yoghurt (1% fat, 3.7% protein). An intermediate second mix was prepared by mixing whole milk and gelatine at the temperature between 70 to 75° during 5 minutes of maximal stirring with a disperser Heidolph equipped with a blade deflocculator. When the temperature is between 40 and 50° C., this mix was added into the plain set yoghurt.

These compositions were subjected or not to a freezing step, followed when appropriate by a thawing step as described in example 1. The obtained products were analysed by a penetrometry test as described in example 1 and by a sensory test as described in example 1. The results obtained are presented below:

TABLE 5

|  | Strength (g) | Standard Deviation |
|---|---|---|
| Composition 2 with freezing/thawing | 112 | 2 |
| Composition 2 without freezing | 131 | 3 |
| Composition 3 with freezing/thawing | ND | ND |
| Composition 3 without freezing | ND | ND |
| Composition 4 with freezing/thawing | 36 | 5 |
| Composition 4 without freezing | 57 | 0.8 |

TABLE 6

| Sensory test | | Composition 2 with a freezing/thawing step | Composition 2 without a freezing step | Composition 3 with a freezing/thawing step | Composition 3 without a freezing step |
|---|---|---|---|---|---|
| Surface (visually) | Heterogeneous | x |  | X |  |
|  | Shiny |  | x |  | X |
| Texture (visually) | Print with a spoon | x | x |  | X |
|  | Heterogeneous | x |  | X |  |
| Texture (in mouth) | Firm |  | x |  | X |
|  | Product disappears rapidly in the mouth | X |  | X |  |
|  | Spongy/wet | x |  | X |  |
|  | Sticky |  | x |  | X |
|  | Grainy/rough | x |  | X |  |
|  | Lighten |  | x | X |  |
|  | Cohesive | x | x | X | X |

The sign x designates that the characteristic is present.

This example demonstrates that various types of fermented dairy products (white cheese, set yoghurt, Greek-style yoghurt, etc.) can be used in the method according to the invention.

Example 3: Use of Various Types of Texturizing Agents and Various Amounts

Example 1 was reproduced with fermented dairy products comprising various texturizing agents. The following compositions have thus been tested:

TABLE 7

| Ingredients and parameters | Compositions (wt %) | | | | | | | |
|---|---|---|---|---|---|---|---|---|
|  | 5*** | 6 | 7 | 8 | 9 | 10 | 11 | 12 |
| Activia ® cheese (Danone) | — | — | — | — | — | — | 67.6 | 68.8 |
| Tricalcium citrate | — | — | — | — | — | — | 4 | 4 |
| Cristal sugar | — | — | — | — | — | — | 8 | 8 |
| Ultra-sperse ® HV starch (National starch) | 0.4 | 0.4 | 0.4 | 0.4 | 0.4 | 0.4 | 0.4 | 0.4 |
| WPC* 515 (Fonterra) | — | — | — | — | — | — | 6 | 6 |
| Cream 35% | — | — | — | — | — | — | 6 | 6 |
| Gelatine 250 PS100 (Rousselot) | — | 1 | 1.5 | 2 | 2.5 | 3 | — | — |
| Whole milk | — | 6 | 12 | 12 | 12 | 12 | 6 | 6 |
| Gold Agar (Hispanagar) | — | — | — | — | — | — | 2 | — |
| Carrageenan | — | — | — | — | — | — | — | 0.8 |
| Skimmed milk powder | — | — | — | — | — | — | — | — |
| Plain set yoghurt (Danone) | 99.6 | 92.6 | 86.1 | 85.6 | 85.1 | 85.0 | — | — |
| Solid content (%) ** | 13.2 | 14.1 | 14.4 | 14.8 | 15.2 | 15.7 | 33.2 | 32.2 |
| Total protein content (%) ** | 3.7 | 4.6 | 5.0 | 5.5 | 6.0 | 6.5 | 9.6 | 9.7 |

TABLE 7-continued

| Ingredients and parameters | Compositions (wt %) | | | | | | | |
|---|---|---|---|---|---|---|---|---|
| | 5*** | 6 | 7 | 8 | 9 | 10 | 11 | 12 |
| Fat content (%) ** | 1.0 | 1.1 | 1.3 | 1.3 | 1.3 | 1.3 | 4.8 | 4.8 |
| Carbohydrate content (%) ** | 7.3 | 7.1 | 6.9 | 6.9 | 6.9 | 6.9 | 12.9 | 13.7 |

*WPC = Whey protein concentrate
** calculated from the values of the ingredients
***comparative example The compositions have been prepared as follow:

Plain set Yoghurt and range of gelatine: starch was added into 93% plain set yoghurt (1% fat, 3.7% protein). An intermediate second mix was prepared by mixing whole milk and gelatine at the temperature between 70 to 75° during 5 minutes of maximal stirring with a disperser Heidolph equipped with a blade deflocculator. When the temperature is between 40 and 50° C., this mix was added into the plain set yoghurt. To get a range of concentration of gelatine, the quantity of gelatine together with whole milk increases while the quantity of plain set yoghurt decreases.

Activia cheese and gelifying agent: this composition (white cheese) was prepared by mixing Activia® cheese with starch, sugar and tricalcium citrate in order to obtain a first intermediate mix. A second intermediate mix was prepared by mixing whole milk and cream at a temperature between 55 to 60° C. and then adding powder of gelifying (agar or carrageenan) and WPC at a temperature of 90° C. during 5 minutes of maximal stirring with a disperser Heidolph equipped with a blade deflocculator. This second intermediate mix was then added to the first intermediate mix.

Figure 3:
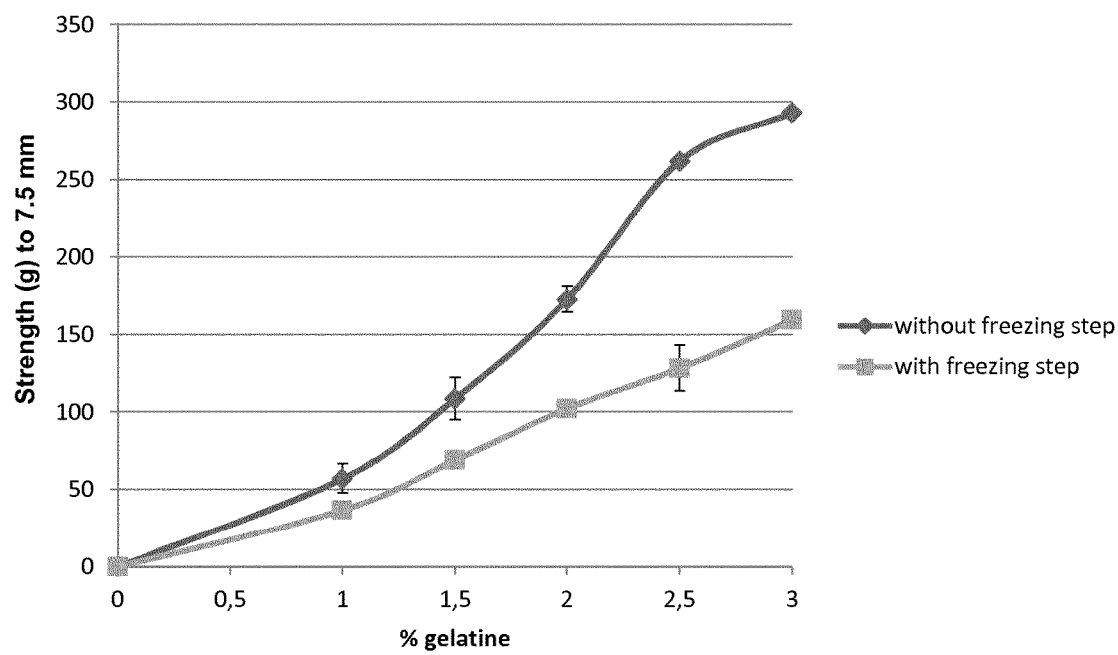
FIG. 3 represents the strength of penetration (g) of the compositions 5 to 10 (described in example 3; gelatin content: 0%, 1%, 1.5%, 2%, 2.5%, 3%) submitted or not to a freezing step, followed when appropriate by a thawing step. The strength of penetration (g) was measured at 7.5 mm of distance.

These compositions were subjected or not to a freezing step, followed when appropriate by a thawing step as described in example 1. The obtained products were analysed by a penetrometry test as described in example 1. The results obtained are presented in the table below in FIG. 3

TABLE 8

| | Strength (g) | Standard Deviation |
|---|---|---|
| Composition 5 with freezing/thawing | 0 | 0 |
| Composition 5 without freezing | 0 | 0 |
| Composition 6 with freezing/thawing | 36 | 5 |
| Composition 6 without freezing | 57 | 0.8 |
| Composition 7 with freezing/thawing | 69 | 1.7 |
| Composition 7 without freezing | 108 | 9.5 |
| Composition 8 with freezing/thawing | 102 | 5.7 |
| Composition 8 without freezing | 172 | 13.6 |
| Composition 9 with freezing/thawing | 128 | 3.8 |
| Composition 9 without freezing | 262 | 8.2 |
| Composition 10 with freezing/thawing | 159 | 14.8 |

TABLE 8-continued

| | Strength (g) | Standard Deviation |
|---|---|---|
| Composition 10 without freezing | 293 | 2 |
| Composition 11 with freezing/thawing | 120 | 4 |
| Composition 11 without freezing | 218 | 22 |
| Composition 12 with freezing/thawing | 15 | 0.2 |
| Composition 12 without freezing | 17 | 0.2 |

The greater the strength of penetration is, the less lighten the final product is and vice versa.

These tests evidenced the change of texture of the fermented dairy products observed after a freezing step followed by a thawing step, the texture being lightened at various amounts of gelatine or with various texturizing agents.

This example demonstrates that various types of texturizing agent and various amounts can be used in the method according to the invention.

Comparative Example 4: Fermented Dairy Products without a Texturizing Agent

The fermented dairy products used in this comparative example were Activia® cheese (Danone) and Oikos® 2.9% fat (Danone), both commercially available.

These fermented dairy products were subjected or not to a freezing step, followed when appropriate by a thawing step as described in example 1. The obtained products were analysed by a penetrometry test as described in example 1.

It was not possible to get data of strength using the penetrometry test in case of these composition because these sample were not enough thick without no texturizing agent.

This comparative example demonstrates that the texture cannot be lightened after a sequence of freezing and thawing steps with a fermented dairy product containing no texturizing agent.

Example 5: Use of Fermented Dairy Products with Various Total Protein Contents

Example 1 was reproduced with fermented dairy products comprising various total protein contents. The following compositions have thus been tested:

TABLE 9

| Ingredients and parameters | Compositions (wt %) | | | | | | | |
|---|---|---|---|---|---|---|---|---|
| | 13 | 14 | 15 | 16 | 17 | 18 | 19 | 20 |
| Actinia ® cheese (Danone) | 34 | 70.6 | 71.1 | 70.6 | 70.1 | 68.6 | 50 | 40 |
| Tricalcium citrate | 4 | 4 | 4 | 4 | 4 | 4 | — | — |
| Cristal sugar | 13 | 12 | 10 | 9 | 8 | 8 | 8 | 8 |
| Ultra-sperse ® HV starch (National starch) | 0.4 | 0.4 | 0.4 | 0.4 | 0.4 | 0.4 | 0.4 | 0.4 |
| WPC* 515 (Fonterra) | — | — | 1.5 | 3 | 4.5 | 6 | 12 | 20 |
| Cream 35% | 6 | 6 | 6 | 6 | 6 | 6 | 8 | 8 |
| Gelatine 250 PS100 (Rousselot) | 1 | 1 | 1 | 1 | 1 | 1 | 1 | 1 |

TABLE 9-continued

| Ingredients and parameters | Compositions (wt %) | | | | | | | |
|---|---|---|---|---|---|---|---|---|
| | 13 | 14 | 15 | 16 | 17 | 18 | 19 | 20 |
| Whole milk | 46 | 6 | 6 | 6 | 6 | 6 | 17 | 22 |
| Cream 40% | — | — | — | — | — | — | — | — |
| Skimmed milk | — | — | — | — | — | — | — | — |
| Skimmed milk powder | — | — | — | — | — | — | — | — |
| Plain set yoghurt (Danone) | — | — | — | — | — | — | — | — |
| Solid content (%) ** | 31.0 | 31.0 | 30.5 | 30.8 | 31.2 | 32.4 | 33.2 | 39.8 |
| Total protein content (%) ** | 4.9 | 6.0 | 7.3 | 8.4 | 9.6 | 10.7 | 14.6 | 20.5 |
| Fat content (%) ** | 4.8 | 4.5 | 4.6 | 4.7 | 4.8 | 4.8 | 5.7 | 6.0 |
| Carbohydrate content (%) ** | 5.9 | 5.9 | 5.7 | 5.7 | 5.7 | 12.9 | 12.9 | 13.2 |

*WPC = Whey protein concentrate
** calculated from the values of the ingredients The compositions have been prepared as follow:

A first intermediate mix has been prepared by mixing Activia® cheese with starch, sugar and tricalcium citrate. A second intermediate mix was prepared by mixing whole milk and cream at a temperature between 55 to 60° C. and then adding powder of gelatine and WPC at a temperature of 75° C. during 5 minutes of maximal stirring with a disperser Heidolph equipped with a blade defloculator. This second intermediate mix was then added to the first intermediate mix. Composition 19 and 20 were prepared differently because of the high level of WPC powder. The second intermediate mix has been prepared by 20% of the first intermediate mix heated between 55 to 60° C. and then WPC, gelatine, whole milk and cream were added at a temperature of 75° C. during 5 minutes of maximal stirring with a disperser Heidolph equipped with a blade defloculator. This second intermediate mix was then added to the first intermediate mix.

These compositions were subjected to a freezing step, followed by a thawing step as described in example 1. The obtained products were analysed by a penetrometry test as described in example 1. The results obtained are presented in the table below and in FIG. 4:

TABLE 10

| | Strength (g) | Standard Deviation |
|---|---|---|
| Composition 13 (TP4.9%) with freezing/thawing | 26 | 2 |
| Composition 14 (TP6.0%) with freezing/thawing | 41 | 2 |

TABLE 10-continued

| | Strength (g) | Standard Deviation |
|---|---|---|
| Composition 15 (TP7.3%) with freezing/thawing | 38 | 1 |
| Composition 16 (TP8.4%) with freezing/thawing | 42 | 1 |
| Composition 17 (TP9.6%) with freezing/thawing | 41 | 1 |
| Composition 18 (TP10.7%) with freezing/thawing | 48 | 1 |
| Composition 19 (TP14.6%) with freezing/thawing | 68 | 1 |
| Composition 20 (TP20.5%) with freezing/thawing | 110 | 3 |

TP = Total protein content

This example demonstrates that fermented dairy products with various total protein contents can be used in the method according to the invention.

However, for compositions with a TP above 10.7% we observe a change on the texture especially on the thinness of framework and firmness as detailed in the table below:

TABLE 11

| | | Comp. 13 TP 4.9% | Comp. 14 TP 6.0% | Comp. 15 TP 7.3% | Comp. 16 TP 8.4% | Comp. 17 TP 9.6% | Comp. 18 TP 10.7% | Comp. 19 TP 14.6% | Comp. 20 TP 20.5% |
|---|---|---|---|---|---|---|---|---|---|
| Surface (visually) | Heterogeneous | X | X | X | X | X | X | X | X |
| Texture (visually) | Heterogeneous | | +/− | +/− | X | X | X | X | X |
| | thinness framework | 4 | 7 | 8 | 10 | 10 | 10 | 10 | 10 |
| Texture | firmness | 3 | 5 | 6 | 7 | 7 | 8 | 9 | 10 |
| | Spongy/wet | 8 | 5 | 3 | 3 | 3 | 3 | 0 | 0 |
| | Grainy/rough | | +/− | +/− | X | X | X | X | X |
| | thinness framework | 4 | 5 | 7 | 7 | 7 | 8 | 9 | 10 |
| | non Cohesive | | | X | X | X | X | X | X |

0 is the lowest note and 10 the highest note

For compositions with a TP above 10.7% we observe that a freezing and thawing cycle always lightens the texture but the resulting products lose their spongy aspect.

Example 6: Use of Fermented Dairy Products with Various Solid Contents

Example 1 was reproduced with fermented dairy products comprising various solid contents. The following compositions have thus been tested:

TABLE 12

| Ingredients and parameters | Compositions (wt %) | | | | | |
|---|---|---|---|---|---|---|
| | 21 | 22 | 23 | 24 | 25 | 26 |
| Activia ® cheese (Danone) | 86.6 | 81.6 | 78.6 | 74.6 | 71.6 | 68.6 |
| Tricalcium citrate | — | — | — | — | 1 | 4 |
| Cristal sugar | — | — | 3 | 6 | 8 | 8 |
| Ultra-sperse ® HV starch (INational starch) | 0.4 | 0.4 | 0.4 | 0.4 | 0.4 | 0.4 |
| WPC* 515 (Fonterra) | — | 5 | 5 | 6 | 6 | 6 |
| Cream 35% | 6 | 6 | 6 | 6 | 6 | 6 |
| Gelatine 250 PS100 (Rousselot) | 1 | 1 | 1 | 1 | 1 | 1 |
| Whole milk | 6 | 6 | 6 | 6 | 6 | 6 |
| Cream 40% | — | — | — | — | — | — |
| Skimmed milk | — | — | — | — | — | — |
| Skimmed milk powder | — | — | — | — | — | — |
| Plain set yoghurt (Danone) | — | — | — | — | — | — |
| Solid content (%) ** | 17.8 | 21.7 | 24.1 | 27.4 | 29.9 | 32.4 |
| Total protein content (%) ** | 7.1 | 10.8 | 10.6 | 11.1 | 10.9 | 10.7 |
| Fat content (%) ** | 5.0 | 5.1 | 5.1 | 5.0 | 4.9 | 4.8 |
| Carbohydrate content (%) ** | 5.7 | 5.8 | 5.6 | 5.4 | 5.5 | 5.6 |

*WPC = Whey protein concentrate
** calculated from the values of the ingredients The compositions have been prepared as follow:

A first intermediate mix has been prepared by mixing Activia® cheese with starch, sugar and tricalcium citrate. A second intermediate mix was prepared by mixing whole milk and cream at a temperature between 55 to 60° C. and then adding powder of gelatine and WPC at a temperature of 75° C. during 5 minutes of maximal stirring with a disperser Heidolph equipped with a blade deflocculator. This second intermediate mix was then added to the first intermediate mix.

These compositions were subjected to a freezing step, followed by a thawing step as described in example 1. The obtained products were analysed by a penetrometry test as described in example 1. The results obtained are presented below:

TABLE 13

| | Strength (g) | Standard Deviation |
|---|---|---|
| Composition 21 (ES 17.8%) with freezing/thawing | 25 | 0 |
| Composition 22 (ES 21.7%) with freezing/thawing | 39 | 3 |

TABLE 13-continued

| | Strength (g) | Standard Deviation |
|---|---|---|
| Composition 23 (ES 24.1%) with freezing/thawing | 38 | 2 |
| Composition 24 (ES 27.4%) with freezing/thawing | 37 | 2 |
| Composition 25 (ES 29.9%) with freezing/thawing | 40 | 1 |
| Composition 26 (ES 32.4%) with freezing/thawing | 48 | 1 |

ES = "extrait sec" = Solid content

This example demonstrates that fermented dairy products with various solid contents can be used in the method according to the invention.

However, for compositions with a ES under 21% we observe a change on the texture specially on the thinness of framework and firmness and the spongy/wet aspect as detailed in the table below.

TABLE 14

| | | Comp. 21 ES 17.8% | Comp. 22 ES 21.7% | Comp. 23 ES 24.1% | Comp. 24 ES 27.4% | Comp. 25 ES 29.9% | Comp. 26 ES 32.4% |
|---|---|---|---|---|---|---|---|
| Surface (visually) | Heterogeneous | X | X | X | X | X | X |
| Texture (visually) | Heterogeneous | | | X | X | X | X |
| | thinness framework | 1 | 3 | 4 | 8 | 8 | 10 |

TABLE 14-continued

| | | Comp. 21 ES 17.8% | Comp. 22 ES 21.7% | Comp. 23 ES 24.1% | Comp. 24 ES 27.4% | Comp. 25 ES 29.9% | Comp. 26 ES 32.4% |
|---|---|---|---|---|---|---|---|
| Texture | firmness | 2 | 6 | 8 | 9 | 9 | 10 |
| | Spongy/wet | 10 | 7 | 4 | 3 | 3 | 3 |
| | thinness framework | 0 | 1 | 4 | 6 | 9 | 10 |
| | non Cohesive | | | | X | X | X |

Example 7: Use of Various Conditions of Freezing 60 g of the composition 1 described in example 1 above have been filled in a container before being:
- frozen in a blast chiller "Alexander 5" from Studio 54 srl company at a temperature of −40° C. during 40 to 50 min to obtain a frozen fermented dairy product with a temperature of about −20° C. in the heart of the product, and then thawed in a cold chamber at 4° C. during 30 hours; or
- frozen in a cryogenic cells (Mini cell Silversas from Air Liquide using liquid nitrogen as a cryogenic fluid at a temperature of −100° C. during 20 to 30 min to obtain a frozen fermented dairy product with a temperature of about −20° C. in the heart of the product, and then thawed in a cold chamber at 4° C. during 30 hours.

The obtained products were analysed by a penetrometry test as described in example 1. The results obtained are presented below and in FIG. 5:

TABLE 15

| | Strength (g) | Standard |
|---|---|---|
| blast chiller −40° C. | 144 | 8 |
| cryogenic cell −100° C. | 205 | 10 |

This example demonstrates that various freezing conditions can be used in the method according to the invention.

The invention claimed is:

1. A method to lighten the texture of a fermented dairy product comprising the following steps of:
    (a) providing a fermented dairy product containing 0.001 to 8 wt % of a texturizing agent and having a solid content comprised between 9.5 and 42 wt % and a total protein content comprised between 2.5 and 25 wt % in a container,
    (b) freezing the said fermented dairy product at a temperature below 0° C. to obtain a frozen fermented dairy product,
    wherein the fermented dairy product is:
        (i) then brought to a temperature of −2 to 2° C. in less than 8 to 12 minutes,
        (ii) then brought to a temperature of −5 to −10° C. in less than 15 to 30 minutes, and
        (iii) finally brought to a temperature of at least −20° C. in less than 8 to 12 minutes, and
    (c) thawing the said frozen fermented dairy product at a temperature comprised between 0° C. and 10° C. to obtain a refrigerated fermented dairy product with a lightened texture.

2. The method according to claim 1, wherein the fermented dairy product is a fermented milk, a yogurt, or a fresh cheese.

3. The method according to claim 2, wherein the yogurt is a stirred yogurt, a set yogurt or a strained yogurt; and the fresh cheese is a white cheese or a petit-suisse.

4. The method according to claim 1, wherein the texturizing agent is a gelling agent.

5. The method according to claim 4, wherein the gelling agent is chosen among gelatine, agar, carrageenan, pectin, and combinations thereof.

6. The method according to claim 1, wherein the fermented dairy product contains a ferment chosen among:
    Lactobacillus sp.,
    Lactococcus sp.,
    Bifidobacterium sp.,
    Streptococcus sp.,
    and mixtures thereof.

7. The method according to claim 6, wherein the ferment is chosen among Lactobacillus bulgaricus, Lactobacillus acidophilus, Lactobacillus paracasei, Lactobacillus pentosus, Lactobacillus helveticus, Lactobacillus reuteri, Lactobacillus plantarum, Lactobacillus bifidus, Lactococcus lactis, Bifidobacterium bifidum, Bifidobacterium infantis, Bifidobacterium animalis, Bifidobacterium breve, Bifidobacterium longum, Streptococcus thermophilus, Streptococcus lactis, Streptococcus raffinolactis, Streptococcus cremoris and combinations thereof.

8. The method according to claim 1, wherein the fermented dairy product has a total protein content of between 6 and 17 wt %.

9. The method according to claim 8, wherein the fermented dairy product has a total protein content of between 9 and 13 wt %.

10. The method according to claim 1, wherein the fermented dairy product has a solid content of between 15 and 40 wt %.

11. The method according to claim 1, wherein the container is adapted for a portion of fermented dairy product of 50 to 250 g and having a thickness comprised between 10 and 100 mm.

12. The method according to claim 1, wherein the freezing step (b) is carried out by direct contact of the fermented dairy product with a refrigerant; or by indirect contact.

13. The method according to claim 12, wherein the refrigerant is liquid nitrogen, liquid CO$_2$ or cold air.

14. The method according to claim 12, wherein the freezing step (b) is carried out by direct contact of the fermented dairy product with a refrigerant in a cryogenic freezer, a cryogenic tunnel, a deep-freezer or a deep-freezing tunnel; or by indirect contact in a freezer.

15. The method according to claim 1, wherein, at the end of the thawing step (c), the refrigerated fermented dairy product has a temperature of between 0 and 10° C.

16. The method according to claim 1, wherein the thawing step (c) is carried out by placing the frozen fermented dairy product in a refrigerated room or device in which the temperature is of between 0 and 10° C.

17. The method according to claim 1, wherein a topping and/or a base layer are/is added to the fermented dairy product before or after the freezing step (b).

18. The method according to claim 17, wherein the topping and/or base layer comprise(s) a sauce; a jelly; a jam; fruits; fruit pieces; another layer of a fermented dairy product; chocolate pieces; cereal-based toppings; and combinations thereof.

* * * * *